(12) United States Patent
Park et al.

(10) Patent No.: US 8,750,397 B2
(45) Date of Patent: Jun. 10, 2014

(54) APPARATUS AND METHOD FOR CHANNEL ESTIMATION IN WIRELESS COMMUNICATION SYSTEM

(75) Inventors: Yun-Sang Park, Suwon-si (KR); Jae-Hwan Chang, Suwon-si (KR); Young-Hak Kim, Suwon-si (KR)

(73) Assignee: Samsung Electronics Co., Ltd (KR)

( * ) Notice: Subject to any disclaimer, the term of this patent is extended or adjusted under 35 U.S.C. 154(b) by 385 days.

(21) Appl. No.: 12/682,157

(22) PCT Filed: Oct. 7, 2008

(86) PCT No.: PCT/KR2008/005867
§ 371 (c)(1), (2), (4) Date: Apr. 8, 2010

(87) PCT Pub. No.: WO2009/048248
PCT Pub. Date: Apr. 16, 2009

(65) Prior Publication Data
US 2010/0226451 A1    Sep. 9, 2010

(30) Foreign Application Priority Data

Oct. 8, 2007  (KR) .................. 10-2007-0100749

(51) Int. Cl.
*H04L 27/28* (2006.01)
(52) U.S. Cl.
USPC ....................................... 375/260
(58) Field of Classification Search
USPC ........... 375/260–262, 265, 267; 370/208, 210
See application file for complete search history.

(56) References Cited

U.S. PATENT DOCUMENTS

| | | | |
|---|---|---|---|
| 6,850,481 B2 | 2/2005 | Wu et al. | |
| 7,260,055 B2 | 8/2007 | Wang et al. | |
| 2001/0033604 A1 | 10/2001 | Ando et al. | |
| 2006/0291577 A1* | 12/2006 | Boariu | 375/260 |
| 2007/0053282 A1* | 3/2007 | Tong et al. | 370/208 |
| 2007/0189402 A1* | 8/2007 | Yang | 375/260 |
| 2008/0108310 A1* | 5/2008 | Tong et al. | 455/69 |
| 2008/0310530 A1* | 12/2008 | Imamura et al. | 375/260 |
| 2009/0059885 A1* | 3/2009 | Sadek et al. | 370/343 |
| 2009/0274174 A1* | 11/2009 | Hwang et al. | 370/480 |

FOREIGN PATENT DOCUMENTS

| | | |
|---|---|---|
| EP | 1235398 A1 | 8/2002 |
| KR | 1020060000402 | 1/2006 |
| WO | WO 2005/125044 | 12/2005 |

OTHER PUBLICATIONS

PCT/ISA/237 Written Opinion issued in PCT/KR2008/005867, Mar. 25, 2009.

* cited by examiner

*Primary Examiner* — Young T. Tse
(74) *Attorney, Agent, or Firm* — The Farrell Law Firm, P.C.

(57) ABSTRACT

An apparatus and method for regulating arrangement of pilot subcarriers to improve a channel estimation throughput in a wireless communication system using an Orthogonal Frequency Division Multiplexing (OFDM) scheme are provided. The apparatus includes a pilot pattern manager for providing control such that pilots are non-uniformly generated according to a distance of a preamble in order to provide a constant link throughput of the frame when the downlink frame is generated.

16 Claims, 6 Drawing Sheets

PILOT  DATA

APPARATUS AND METHOD FOR CHANNEL ESTIMATION IN WIRELESS COMMUNICATION SYSTEM

TECHNICAL FIELD

The present invention relates to a wireless communication system using an Orthogonal Frequency Division Multiplexing (OFDM) scheme. More particularly, the present invention relates to an apparatus and method for regulating arrangement of pilot subcarriers to improve a channel estimation throughput in a wireless communication system using an OFDM scheme.

BACKGROUND ART

Wireless communication systems have recently developed to radio data packet communication systems that can provide multimedia services with a high speed and high quality beyond the early voice-oriented services. To transmit data with a high speed by using a limited frequency resource, the wireless communication system uses Adaptive Modulation and Coding (AMC) that regulates a modulation rate and a coding rate according to a channel state. In this case, a channel of the wireless communication system changes frequently due to several factors, such as, white noise, received signal power change caused by fading, shadowing, Doppler effect depending on movement of a mobile terminal and frequent speed change, interference caused by other users or multipath signals, etc.

As described above, the channel of the wireless communication system changes according to a state of a radio resource. That is, a signal transmitted by a transmitter of the wireless communication system is distorted according to changes in the channel. To compensate for the distortion of the signal, a receiver of the wireless communication system performs channel estimation. For example, when the wireless communication system uses Binary Phase Shift Keying (BPSK) and Quadrature PSK (QPSK), the receiver compensates for the channel by predicting only a phase of a received signal. The BPSK and the QPSK are low-order modulation schemes included in the AMC. When the wireless communication system uses a high-order modulation scheme such as 8-ary Phase Shift Keying (8PSK) and 16-ary Quadrature Amplitude Modulation (16QAM), a plurality of symbols are located in each quadrant and a plurality of symbols each having a different amplitude component can be located at the same phase. Therefore, the receiver needs to estimate not only a phase component but also an amplitude component.

The transmitter transmits a pilot signal in order to estimate the channel. The pilot signal is known to the receiver in advance. That is, the receiver estimates the channel by using the pilot signal transmitted by the transmitter, and thereafter demodulates a data signal by using a value of the estimated channel. To improve accuracy of the channel estimation in the receiver, the transmitter has to transmit more amounts of pilot signals more frequently.

Since the pilot signal and the data signal use limited resources (e.g., frequency and time resources) in the transmitter, a throughput for the data signal decreases when the pilot signal is transmitted more frequently.

Accordingly, by considering a Doppler frequency, delay spread, etc., the transmitter transmits the pilot signal with a specific interval in a frequency and time resource as shown in FIG. 1.

FIG. 1 illustrates a pilot pattern of a conventional Orthogonal Frequency Division Multiplexing (OFDM) system.

Referring to FIG. 1, the OFDM system transmits a pilot signal with a specific interval in a frequency resource and a time resource.

By using the pilot signal transmitted with the specific interval, a receiver calculates a channel value of a data signal region, that is, a region where the pilot signal is not transmitted. For example, in the estimation of the channel value of the data signal region, the receiver may perform linear interpolation or the like on the channel value estimated using the pilot signal.

When a signal is transmitted and received using the same pilot pattern in the OFDM system, a preamble with a high pilot density has a best channel estimation throughput. Channel estimation information is used in channel estimation for subsequent OFDM symbols. In this case, there is a problem in that the greater the temporal distance from the preamble, the poorer the channel estimation throughput.

The aforementioned problem can be addressed by regulating a number of times of transmitting the pilot pattern by using feedback information of a mobile terminal. However, there is still an unsolved problem in that the channel estimation throughput deteriorates as a result of uniform density of pilot signals included in a frame. That is, when subcarriers are located at edge portions in a two-dimensional downlink frame, a relatively small number of pilots can be used in channel estimation, and thus there is a problem in that a link throughput decreases.

As described above, in the conventional method, the same modulation scheme and coding rate are used at all locations within a frame according to channel quality information in a frame unit. When channel estimation is performed on a rear portion of the frame, spectrum usage efficiency may deteriorate. This is because a link throughput is relatively good in a front portion, but a higher modulation scheme and coding rate are not used in the front portion of the frame. On the contrary, when channel estimation is performed on the front portion of the frame or on edge portions of the frame wherein the rear portion has a poor link throughput, errors may frequency occur in the rear portion of the frame.

DISCLOSURE OF INVENTION

Technical Solution

An aspect of the present invention is to solve at least the above-mentioned problems and/or disadvantages and to provide at least the advantages described below. Accordingly, an aspect of the present invention is to provide an apparatus and method for improving a channel estimation throughput in a wireless communication system.

Another aspect of the present invention is to provide an apparatus and method for improving a channel estimation throughput by generating pilots non-uniformly according to a distance of a preamble so that a frame has a constant link throughput when a transmitter of a wireless communication system generates a downlink frame.

Another aspect of the present invention is to provide an apparatus and method for performing channel estimation by separating non-uniformly inserted pilots from a downlink frame by using a pilot pattern in a receiver of a wireless communication system.

In accordance with an aspect of the present invention, a transmitter for generating a downlink frame to improve a channel estimation throughput is provided. The transmitter includes a pilot pattern manager for providing control such that pilots are non-uniformly generated according to a distance of a preamble in order to provide a constant link throughput of the frame when the downlink frame is generated.

In accordance with another aspect of the present invention, a receiver for performing channel estimation is provided. The receiver includes a pilot pattern manager for obtaining a pilot pattern from a downlink frame transmitted by a transmitter and for separating non-uniformly inserted pilots by using the obtained pilot pattern.

In accordance with another aspect of the present invention, a method of generating a downlink frame to improve a channel estimation throughput in a transmitter is provided. The method includes generating pilots non-uniformly according to a distance of a preamble in order to provide a constant link throughput of the frame when the downlink frame is generated.

In accordance with another aspect of the present invention, a method of performing channel estimation in a receiver is provided. The method includes obtaining a pilot pattern from a downlink frame transmitted by a transmitter, and separating non-uniformly inserted pilots by using the obtained pilot pattern.

BRIEF DESCRIPTION OF THE DRAWINGS

The above and other aspects, features and advantages of certain exemplary embodiments of the present invention will be more apparent from the following detailed description taken in conjunction with the accompanying drawings, in which.

BEST MODE FOR CARRYING OUT THE INVENTION

Exemplary embodiments of the present invention will be described below with reference to the accompanying drawings. In the following description, well-known functions or constructions are not described in detail since they would obscure the invention in unnecessary detail.

The present invention provides an apparatus and method for regulating arrangement of pilot subcarriers to improve a channel estimation throughput in a wireless communication system using an Orthogonal Frequency Division Multiplexing (OFDM) scheme.

Although a communication system using an Orthogonal Frequency Division Multiplexing Access (OFDMA) scheme will be described hereinafter, the present invention may also apply to communication systems using other multiple access schemes.

Figure 1:
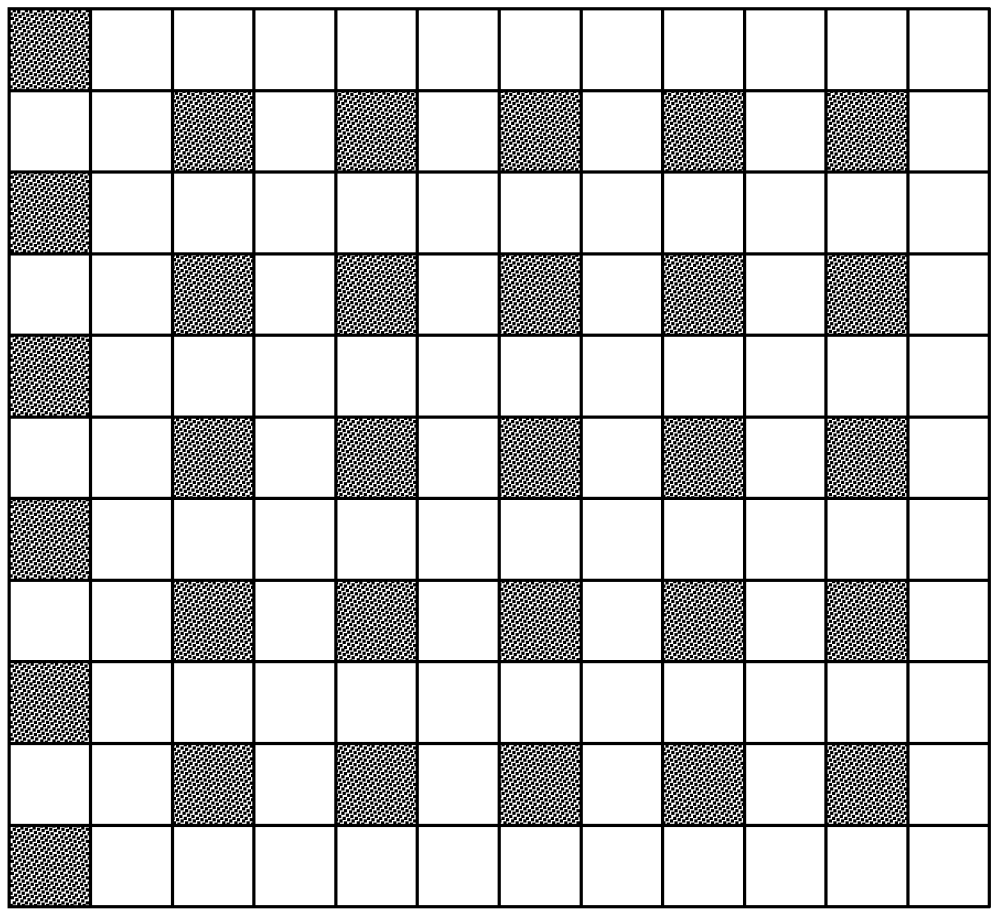
FIG. 1 illustrates a pilot pattern of a conventional Orthogonal Frequency Division Multiplexing (OFDM) system.
Figure 1:
Figure 1:
Figure 2:
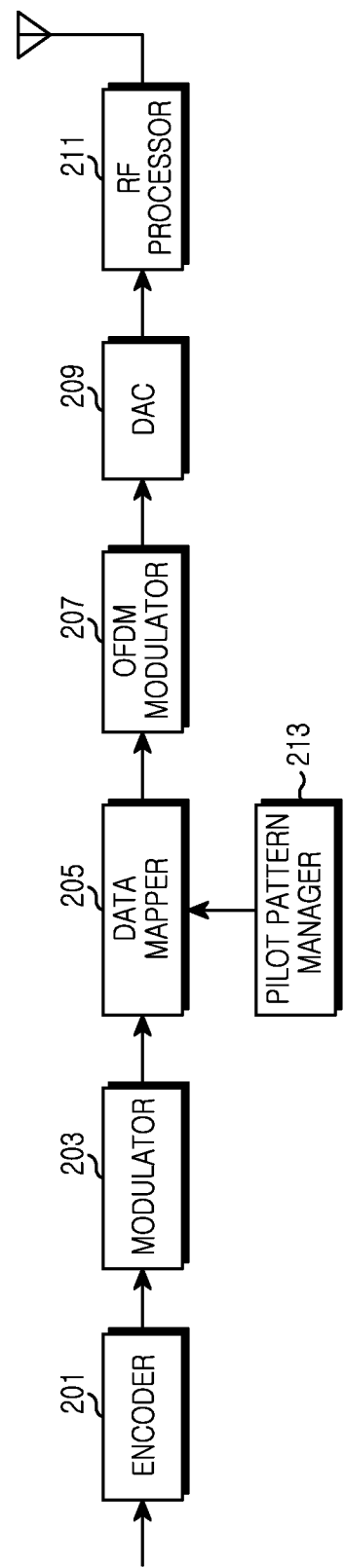
FIG. 2 illustrates a structure of a transmitter of a broadband wireless communication system according to an exemplary embodiment of the present invention.

FIG. 2 illustrates a structure of a transmitter of a broadband wireless communication system according to an exemplary embodiment of the present invention. Herein, the transmitter is not fixed but relative. The transmitter may be a mobile terminal in uplink and may be a base station in downlink.

The transmitter includes an encoder 201, a modulator 203, a data mapper 205, an OFDM modulator 207, a Digital/Analog Converter (DAC) 209, a Radio Frequency (RF) processor 211, and a pilot pattern manager 213.

Referring to FIG. 2, the encoder 201 codes input information bit-streams at a corresponding coding rate and outputs coded bits or symbols. If the number of input information bits is k and a coding rate is R, the number of output symbols is k/R. The encoder 201 may be a convolutional encoder, a turbo encoder, a low density parity check (LDPC) encoder, etc.

The modulator 203 outputs complex symbols by performing signal point mapping on the symbols received from the encoder 201 according to a predetermined modulation scheme (i.e., a modulation level). Examples of the modulation scheme include Binary Phase Shift Keying (BPSK) for mapping one bit (s=1) to one signal point (complex symbol), Quadrature Phase Shift Keying (QPSK) for mapping two bits (s=2) to one complex symbol, 8-ary Phase Shift Keying (8PSK) for mapping three bits (s=3) to one complex symbol, 16-ary Quadrature Amplitude Modulation (16QAM) for mapping four bits (s=4) to one complex symbol, 64-ary Quadrature Amplitude Modulation (64QAM) for mapping six bits (s=6) to one complex symbol, etc.

The data mapper 205 maps the complex symbols output from the modulator 203 onto subcarriers according to a control signal provided from an upper layer. Further, the data mapper 205 outputs the complex symbols mapped onto the subcarriers to respective memory addresses of a frame buffer (not shown). The memory addresses correspond to actual frame sizes.

The pilot pattern manager 213 generates a pilot signal by using a pilot pattern of a predetermined scheme, or configures a pilot pattern. Thereafter, the pilot pattern manager 213 provides control so that the pilot signal is generated according to the pilot pattern. For example, when a downlink frame is generated, the pilot pattern manager 213 provides control so that pilots are more densely inserted in a rear portion of the frame. In addition, in edge portions of the frame, pilots are inserted in a predetermined pilot pattern and are more densely present than a center portion of the frame.

The OFDM modulator 207 converts the complex symbols into time-domain sample data by performing an Inverse Fast Fourier Transform (IFFT), and then outputs an OFDM symbol by duplicating and appending a specific rear portion of the sample data to a front portion of the sample data.

The DAC 209 converts the sample data output from the OFDM modulator 207 into an analog signal. The RF processor 211 includes a filter, a front-end unit, etc. A signal output from the DAC 209 is RF-processed so that the signal can be transmitted. Thereafter, the signal is transmitted using a wireless channel through a Transmit (Tx) antenna. When the signal transmitted by the transmitter is received through a Receive (Rx) antenna of a receiver, noise is added to the signal while the signal passes through a multi-path channel.

Figure 3:
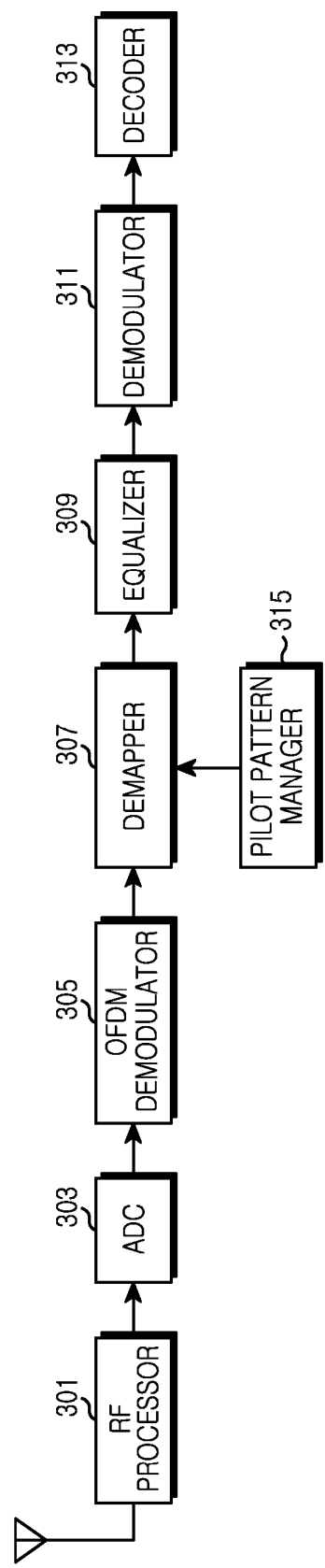
FIG. 3 illustrates a structure of a receiver of a broadband wireless communication system according to an exemplary embodiment of the present invention.

FIG. 3 illustrates a structure of a receiver of a broadband wireless communication system according to an exemplary embodiment of the present invention. Herein, the receiver is not fixed but relative. The receiver may be a base station in uplink and may be a mobile terminal in downlink.

Referring to FIG. 3, the receiver includes an RF processor 301, an Analog/Digital Converter (ADC) 303, an OFDM demodulator 305, a demapper 307, an equalizer 309, a demodulator 311, a decoder 313, and a pilot pattern manager 315.

The RF processor 301 includes a front-end unit, a filter, etc. The RF processor 301 converts a high-frequency band signal, which has passed through a wireless channel, into a baseband signal. The ADC 303 converts an analog baseband signal output from the RF processor 301 into a digital signal.

The OFDM demodulator 305 removes a Cyclic Prefix (CP) from data output from the ADC 303, and outputs frequency-domain data by performing a Fast Fourier Transform (FFT).

The demapper 307 extracts actual data symbols from data output from the OFDM demodulator 305. By using a pilot pattern obtained by the pilot pattern manager 315, the demapper 307 extracts symbols (e.g., pilot symbols) located at predetermined positions for channel estimation and provides the extracted symbols to a channel estimator (not shown).

The pilot pattern manager 315 obtains the pilot pattern from the OFDM symbols and provides the obtained pilot pattern to the demapper 307.

By using the pilot symbols from the demapper 307, the channel estimator (not shown) performs channel estimation and provides values of the channel estimation to the equalizer 309.

By using the channel estimation values from the channel estimator (not shown), the equalizer 309 performs channel compensation on data symbols output from the demapper 307. That is, several noise components generated in the wireless channel are compensated for.

The demodulator 311 demodulates symbols output from the equalizer 309 according to a modulation scheme of the transmitter and then outputs coded data. The decoder 313 decodes the coded data output from the demodulator 311 according to a coding scheme of the transmitter and restores the data into original information data.

Figure 4:
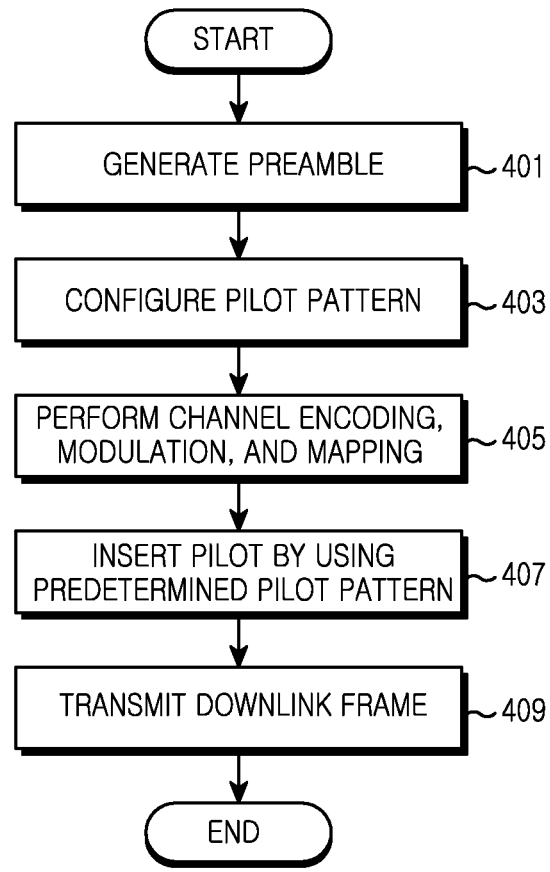
FIG. 4 is a flowchart illustrating a process of regulating arrangement of pilot sub-carriers to improve a channel estimation throughput in a transmitter according to an exemplary embodiment of the present invention.
Figure 6:
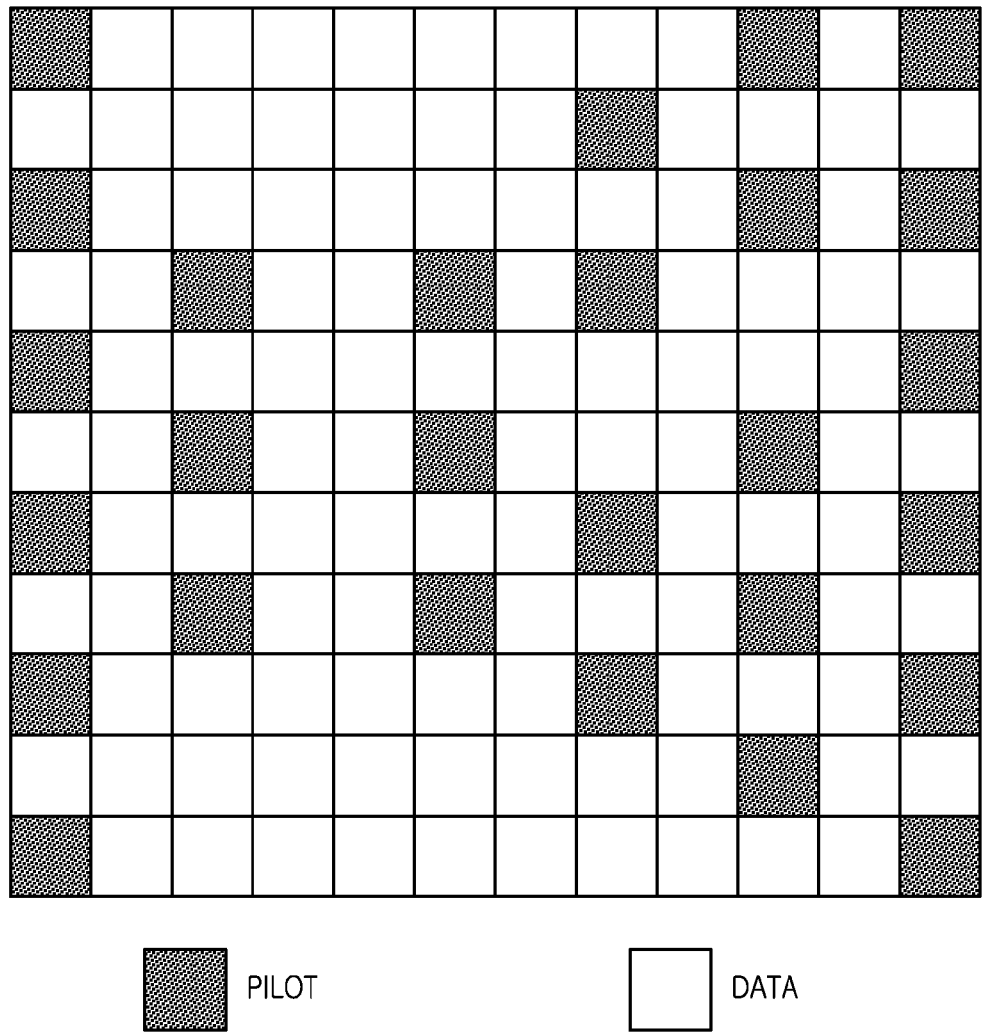
FIG. 6 illustrates a pilot pattern of an OFDM system according to an exemplary embodiment of the present invention.

FIG. 4 is a flowchart illustrating a process of regulating arrangement of pilot sub-carriers to improve a channel estimation throughput in a transmitter according to an exemplary embodiment of the present invention. It is assumed in FIG. 4 that a downlink frame is generated by a base station. A pilot pattern of an OFDM system as shown in FIG. 6 will be used in the following descriptions.

Referring to FIG. 4, the transmitter generates a preamble in step 401, and performs a process of configuring the pilot pattern in step 403. The pilot pattern is configured in such a manner that, when the downlink frame is generated, pilots are more densely inserted in a rear portion of the frame than a front portion of the frame. In addition, in edge portions of the frame, pilots are inserted in a predetermined pilot pattern and are more densely present than a center portion of the frame. Information on the configured pilot pattern may be included in the preamble of the frame or may be included in a portion of the frame.

In step 405, the transmitter performs typical channel encoding, modulation, mapping, etc. In step 407, the transmitter provides control so that the pilots are inserted into the frame by using the pilot pattern configured in step 403. That is, a pilot density within a data bit is determined according to a predetermined pilot arrangement format. As shown in FIG. 6, the transmitter can provide control so that pilots are more densely inserted in a rear portion of the frame than a front portion of the frame. In addition, in edge portions of the frame, pilots are inserted in a predetermined pilot pattern and are more densely present than a center portion of the frame.

In step 409, the transmitter transmits the generated downlink frame to the mobile terminal. In this case, the downlink frame is transmitted through typical processes (i.e., IFFT, parallel-to-serial conversion, and guard interval insertion). Then, the downlink frame is transmitted through the RF processor 211 of the transmitter. Detailed descriptions thereof will be omitted.

Thereafter, the procedure of FIG. 4 ends.

Figure 5:
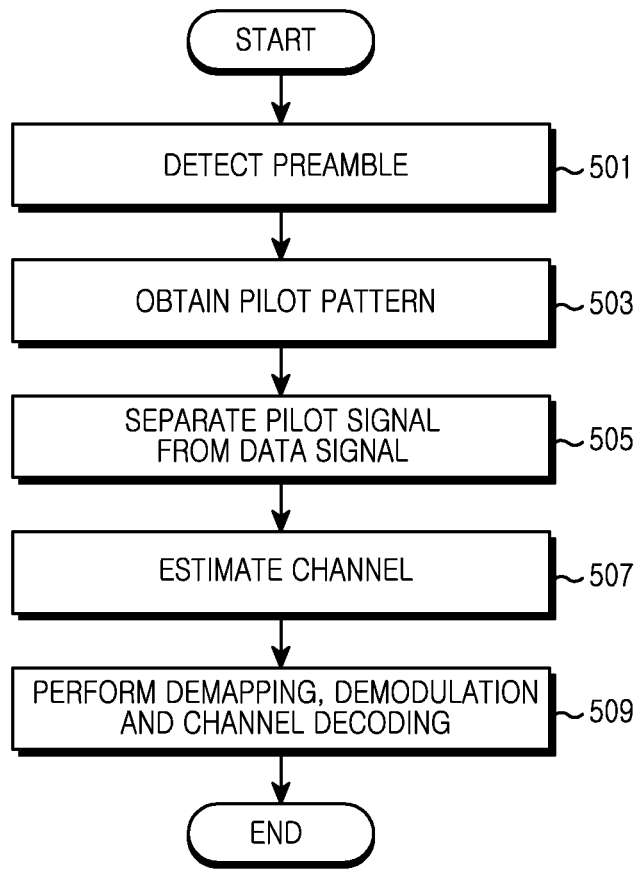
FIG. 5 is a flowchart illustrating a channel estimation process of a receiver according to an exemplary embodiment of the present invention.

FIG. 5 is a flowchart illustrating a channel estimation process of a receiver according to an exemplary embodiment of the present invention. A pilot pattern of an OFDM system as shown in FIG. 6 will be used in the following descriptions.

Referring to FIG. 5, the receiver receives data from an Rx antenna or performs an RF process. Thereafter, the receiver detects a preamble from a downlink frame in step 501.

In step 503, the receiver instructs the pilot pattern manager 315 to obtain pilot pattern information inserted into the downlink frame as illustrated in FIG. 6. In step 505, the receiver separates the pilot from the data according to the pilot pattern information obtained by the pilot pattern manager 315. The pilot information pattern may be included in the preamble or may be included in a portion of the downlink frame. According to the present invention, as shown in FIG. 6, pilots may be more densely present in a rear portion of the frame than a front portion of the frame. In addition, pilots may be more densely present in edge portions of the frame than a center portion of the frame.

In step 507, the receiver performs a channel estimation process. In step 509, the receiver restores the data by performing demapping, demodulation, and channel decoding.

Thereafter, the procedure of FIG. 5 ends.

FIG. 6 illustrates a pilot pattern of an OFDM system according to an exemplary embodiment of the present invention.

Referring to FIG. 6, when a downlink frame is generated, a transmitter of the present invention can provide control so that pilots are inserted into the frame by using a pilot pattern. The pilot pattern is configured such that pilots are more densely inserted in a rear portion of the frame than a front portion of the frame, and in edge portions of the frame, pilots are inserted in a predetermined pilot pattern and are more densely present than a center portion of the frame. For example, as shown in FIG. 6, the $1^{th}$-$4^{th}$ columns towards the front of the frame (i.e., earliest part of the frame to be transmitted) include 9 pilots, the $5^{th}$-$8^{th}$ columns towards the center of the frame include 7 pilots, and the $9^{th}$-$12^{th}$ columns towards the rear of the frame include 11 pilots. In the $1^{st}$ & $12^{th}$ columns located along the edges of the frame, pilots are inserted at every other row according to the predetermined pattern. Accordingly, a link throughput can be improved in comparison with the conventional method in which pilot signals are generated with a specific interval.

That is, a pilot density within a data bit is determined depending on a predetermined pilot arrangement format of the present invention. The transmitter provides control so that pilots are inserted into a frame by using the pilot pattern in which pilots are more densely inserted in a rear portion of the frame than a front portion of the frame, and in edge portions of the frame, pilots are inserted in a predetermined pilot pattern and are more densely present than a center portion of the frame.

According to exemplary embodiments of the present invention, an apparatus and method for regulating arrangement of pilot subcarriers to improve a channel estimation throughput in a wireless communication system using an OFDM scheme are provided. When a downlink frame is generated, pilots are non-uniformly generated according to a distance of a preamble so that a link throughput of the frame is constant. Therefore, the link throughput can be improved in comparison with the conventional method in which pilot signals are generated with a specific interval. In addition, irrespective of a location within the frame, the link throughput can be constant.

While the present invention has been shown and described with reference to certain exemplary embodiments thereof, it will be understood by those skilled in the art that various changes in form and details may be made therein without departing from the spirit and scope of the present invention as defined by the appended claims and their equivalents. Therefore, the scope of the invention is defined not by the detailed description of the invention but by the appended claims and their equivalents, and all differences within the scope will be construed as being included in the present invention.

The invention claimed is:

1. An apparatus for generating a downlink frame, the apparatus comprising:
   a pilot pattern manager for providing control such that pilots are non-uniformly generated according to a distance from a beginning of the downlink frame in order to provide a constant link throughput of the downlink frame when the downlink frame is generated; and
   a transmitter for transmitting the downlink frame including the non-uniformly generated pilots,
   wherein the pilot pattern manager non-uniformly generates the pilots by controlling an insertion density of the pilots to be inserted in the downlink frame according to a distance between each portion within the downlink frame from the beginning of the downlink frame.

2. The apparatus of claim 1, wherein the pilot pattern manager generates information indicating locations of the non-uniformly generated pilots to a receiver by appending the information to a preamble of the downlink frame or a specific portion of the downlink frame.

3. The apparatus of claim 1, wherein the pilot pattern manager non-uniformly generates the pilots such that the pilots are more densely inserted in a rear portion of the downlink frame than a front portion of the downlink frame.

4. The apparatus of claim 3, wherein the pilot pattern manager non-uniformly generates the pilots such that the pilots are more densely inserted in edge portions of the downlink frame than a center portion of the downlink frame.

5. An apparatus for performing channel estimation, the apparatus comprising:
   a receiver for receiving a downlink frame including non-uniformly inserted pilots; and
   a pilot pattern manager for obtaining a pilot pattern from a the downlink frame transmitted by a transmitter and for separating the non-uniformly inserted pilots by using the obtained pilot pattern,
   wherein the pilot pattern manager extracts the non-uniformly inserted pilots from the downlink frame according to a distance between each portion with the downlink frame from a beginning of the downlink frame, and
   wherein the apparatus performs the channel estimation using the extracted non-uniformly inserted pilots.

6. The apparatus of claim 5, wherein the pilot pattern manager extracts the non-uniformly inserted pilots arranged such that the pilots are more densely present in a rear portion of the downlink frame than a front portion of the downlink frame.

7. The apparatus of claim 6, wherein the pilot pattern manager extracts the non-uniformly inserted pilots arranged such that the pilots are more densely present in edge portions of the downlink frame than a center portion of the downlink frame.

8. The apparatus of claim 5, wherein the pilot pattern manager obtains the pilot pattern from a preamble of the downlink frame or a specific portion of the downlink frame.

9. A method of generating a downlink frame in a transmitter, the method comprising:
   generating pilots non-uniformly according to a distance from a beginning of the downlink frame in order to provide a constant link throughput of the downlink frame when the downlink frame is generated; and
   transmitting the downlink frame including the non-uniformly generated pilots,
   wherein the generating of the pilots comprises controlling an insertion density of the pilots to be inserted in the downlink frame according to a distance between each portion within the downlink frame from the beginning of the downlink frame.

10. The method of claim 9, further comprising:
    appending information indicating locations of the non-uniformly generated pilots by including the information to a preamble of the downlink frame or a specific portion of the downlink frame; and
    transmitting, to a receiver, the downlink frame including the information indicating the pilot locations.

11. The method of claim 9, wherein, in the generating of the pilots non-uniformly according to the distance of from the beginning of the downlink frame, the pilots are more densely inserted in a rear portion of the downlink frame than a front portion of the downlink frame.

12. The method of claim 11, wherein, in the generating of the pilots non-uniformly according to the distance from the beginning of the downlink frame, the pilots are more densely inserted in edge portions of the downlink frame than a center portion of the downlink frame.

13. A method of performing channel estimation in a receiver, the method comprising:
    receiving a downlink frame transmitted by a transmitter;
    obtaining a pilot pattern from the downlink frame transmitted by the transmitter;
    extracting non-uniformly inserted pilots by using the obtained pilot pattern; and
    estimating the channel estimation using the extracted non-uniformly inserted pilots
    wherein the pilots are inserted, by the transmitter, non-uniformly in the downlink frame according to a distance between each portion with the downlink frame from a beginning of the downlink frame.

14. The method of claim 13, wherein, in the extracting of the non-uniformly inserted pilots, the extracted non-uniformly inserted pilots are more densely present in a rear portion of the downlink frame than a front portion of the downlink frame.

15. The method of claim 14, wherein, in the extracting of the non-uniformly inserted pilots, the extracted non-uniformly inserted pilots are more densely present in edge portions of the downlink frame than a center portion of the downlink frame.

16. The method of claim 13, wherein obtaining the pilot pattern comprises obtaining the pilot pattern from a preamble of the downlink frame or a specific portion of the downlink frame.

* * * * *